US010710456B2

(12) United States Patent
Mueller et al.

(10) Patent No.: US 10,710,456 B2
(45) Date of Patent: Jul. 14, 2020

(54) MOBILE DEVICE MONITORING DURING VEHICLE OPERATION

(71) Applicant: Ford Global Technologies, LLC, Dearborn, MI (US)

(72) Inventors: Paul Anthon Mueller, St. Clair Shores, MI (US); Boris Gorovets, West Bloomfield, MI (US); Gregory William Farrey, Ypsilanti, MI (US); John Frederick Locke, Waterford, MI (US); Adam Weiss, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 304 days.

(21) Appl. No.: 15/879,076

(22) Filed: Jan. 24, 2018

(65) Prior Publication Data

US 2019/0225080 A1 Jul. 25, 2019

(51) Int. Cl.
| | |
|---|---|
| *B60K 31/00* | (2006.01) |
| *B60R 16/023* | (2006.01) |
| *B60W 30/14* | (2006.01) |
| *H01Q 1/22* | (2006.01) |
| *H01Q 21/06* | (2006.01) |
| *H01Q 21/22* | (2006.01) |
| *H04M 1/60* | (2006.01) |
| *H04M 1/725* | (2006.01) |
| *H01Q 1/32* | (2006.01) |

(52) U.S. Cl.
CPC ....... *B60K 31/0058* (2013.01); *B60W 30/146* (2013.01); *H04M 1/6091* (2013.01); *H04M 1/7253* (2013.01); *B60K 2031/0091* (2013.01); *H01Q 1/3275* (2013.01); *H01Q 1/3283* (2013.01); *H01Q 21/22* (2013.01); *H04M 1/72577* (2013.01)

(58) Field of Classification Search
CPC ....... B60K 31/0058; B60K 2031/0091; B60W 30/146; H04M 1/72577; H04M 1/6091; H04M 1/7253; H01Q 1/3275; H01Q 21/22; H01Q 1/3283; H01Q 1/3291; H01Q 1/2291; H01Q 21/061
USPC .......................................................... 701/93
See application file for complete search history.

(56) References Cited

U.S. PATENT DOCUMENTS

| | | | |
|---|---|---|---|
| 9,124,703 B2 | 9/2015 | Tadayon et al. | |
| 2010/0062788 A1* | 3/2010 | Nagorniak | H04W 48/04 455/456.1 |
| 2010/0321176 A1* | 12/2010 | Hofmann | B60K 35/00 340/438 |

(Continued)

FOREIGN PATENT DOCUMENTS

DE 10 2009 044 230 A1 4/2011

*Primary Examiner* — Behrang Badii
*Assistant Examiner* — Hossam M Abd El Latif
(74) *Attorney, Agent, or Firm* — Michael Spenner; Brooks Kushman PC (57) ABSTRACT

A vehicle includes an antenna system and a controller. The controller may be configured to, responsive to wireless energy, received via the antenna system, exceeding a magnitude and duration indicative of a cellular connection from a nomadic device at a predetermined position in the vehicle in an absence of a connection with the device via a local protocol while the vehicle is in motion, operate a powertrain to limit a speed of the vehicle.

17 Claims, 4 Drawing Sheets

(56) References Cited

U.S. PATENT DOCUMENTS

| | | | |
|---|---|---|---|
| 2012/0149341 A1* | 6/2012 | Tadayon | H04B 5/0062 |
| | | | 455/412.1 |
| 2013/0249748 A1* | 9/2013 | Togura | H01Q 1/32 |
| | | | 343/713 |
| 2015/0122866 A1* | 5/2015 | Kuchar | B65H 20/06 |
| | | | 226/195 |
| 2015/0122886 A1* | 5/2015 | Koch | G06K 7/10356 |
| | | | 235/440 |
| 2016/0198310 A1 | 7/2016 | Chalmers et al. | |
| 2018/0070291 A1* | 3/2018 | Breaux | H04W 4/33 |
| 2018/0084103 A1* | 3/2018 | Hamilton | H04W 4/48 |

* cited by examiner

MOBILE DEVICE MONITORING DURING VEHICLE OPERATION

TECHNICAL FIELD

This application is generally related to systems and methods for controlling vehicle operation based on a location of a mobile device that is in use.

BACKGROUND

The use of cellular technology in mobile devices to receive and transmit information via text messaging applications, social media applications, Internet web browsers, or other application/program executing on the mobile device presents a potential distraction to an operator of a vehicle. If a driver is focused on interaction with a cellular device, the driver may not be focused on interaction with the driving environment. As a result, some mobile devices/applications/programs restrict use when in motion.

Likewise, connected vehicles present an opportunity for a driver or occupant to access and utilize remote functionality, such as email, text messaging, the Internet, etc., on a near-constant basis while a vehicle is traveling. As this access may create a potential distraction to a driver, some vehicle manufacturers minimize distraction by disabling a substantial amount of vehicular interactive functionality while a vehicle is in motion or traveling over a certain speed. Further, a parent or guardian may want to limit use by a dependent or ward of distractions caused by cellular connectivity (e.g., phone calls, text messages, application/program notifications, or internet queries) while operating a vehicle. This setup can help resolve any connectivity issues by providing some degree of connectivity and remote system access when multiple users are present (e.g., allowing a passenger to use the connected features). A problem may occur, however, when only a single occupant (the driver) is present. Since a manufacturer may have the vehicle configured to disable the vehicular connectivity or interaction functionality, the driver may be tempted to use a wireless device as a source of connectivity while driving.

SUMMARY

A vehicle includes an antenna system and a controller. The controller may be configured to, responsive to wireless energy, received via the antenna system, exceeding a magnitude and duration indicative of a cellular connection from a nomadic device at a predetermined position in the vehicle in an absence of a connection with the device via a local protocol while the vehicle is in motion, operate a powertrain to limit a speed of the vehicle.

A system for a vehicle includes a controller configured to transmit to a device, via Bluetooth, a control message to inhibit reception of messages and notifications over a cellular network with the device while the vehicle is in motion. The controller may further be configured to, responsive to receiving wireless energy indicative of a cellular connection from the device at a driver position in the vehicle in an absence of a connection with the device via Bluetooth while the vehicle is in motion, limit a speed of the vehicle.

A computer-implemented method includes controlling, by a controller, functionality of a vehicle based on a location of a wireless device being a driver seat area and frequency, timing, and strength values of radio-frequency energy received by a sensor indicative of a cellular link in an absence of communication via a Bluetooth link with the wireless device, the wireless device having a predefined association to the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Many new vehicle systems have wireless connectivity features (e.g., Bluetooth handsfree operation, internet connectivity, streaming audio, Phone as a Key, etc.). Knowledge of a location and type of use of a mobile device in a vehicle may be advantageous for parents or guardians of an operator of the vehicle. Often a mobile device connects with an in-vehicle infotainment system using a short-range wireless (e.g., Bluetooth, inductive coupling, IrDA, near field communication, ultra-wideband, and Zigbee) or wired connection (e.g., Universal Serial Bus (USB), headphone/mic jack) and then connects with a remote network using a long-range connection (e.g., cellular, Wi-Fi, etc.) For example, a parent or guardian may want to know if a driver (their child or other ward) within the vehicle is using Bluetooth, or Wi-Fi to connect a phone to an in-vehicle infotainment system, wherein the in-vehicle system may then communicate with the phone to inhibit transmitting/receiving text messages, halt the execution of programs/applications, or inhibit reception of select phone calls (e.g., only allow receiving calls from a select group or making emergency/parental calls). Likewise, the in-vehicle infotainment system may be configured to permit a passenger of the vehicle to transmit/receive text messages, execute programs/applications, and make/receive phone calls. However, with rules and restrictions, individuals being restricted by the rules may desire to circumvent the rules. For example, a child or ward may disable a short-range wireless protocol of their mobile device so that an in-vehicle infotainment system can't connect with the mobile device to inhibit operation. The connection with a vehicle system (e.g., an in-vehicle infotainment system) may provide handsfree operation (the speakers and a mic in the vehicle are used so the driver's hands do not need to hold the mobile device and can be used to control the vehicle. While, if a mobile device is used without handsfree operation, the driver may occupy a hand to hold the device close to their ear and mouth to use the phone, or using fingers to type a message and take their eyes off the road to view a screen of the mobile device, thereby providing a distraction to the driver's attention.

Here, a sensor (one or more broadband phased array antennas, or one or more sets of co-located narrowband phased array antennas collectively covering a broad band frequency range) may be used to scan an area (e.g., the passenger compartment of a vehicle) by selectively changing a beamformed direction and monitoring radio frequency (RF) energy (e.g., a frequency and magnitude of the RF energy) emanated with respect to the beamformed direction to detect a cellular connection/cellular use when the area is a driver seat area. When the controller detects that the RF energy exceeds a threshold while in an absence of a short-range connection (e.g., detecting a cellular connection without a Bluetooth connection) the controller may operate a power train with reduced performance (e.g., set a lower vehicle top speed, reduce a current vehicle speed, reduce a power output, or change an output power in relation to an power request), output wireless data (e.g., a notification, text message, email, or audible message) such that a guardian or parent, is notified of vehicular operation and cellular phone usage. For example, a vehicle system/controller such as an infotainment system may transmit a message to a mobile device via short-range communication (e.g., inductive coupling, near-field communication NFC, Bluetooth, Zigbee, Wi-Fi, or other short-range communication) the message may either directly reconfigure the mobile device or may use an application to limit long-range communication (e.g., cellular data, Wi-Fi, or other long-range communication) to reduce distracting messages (e.g., text message, SMS messages, video messages, pre-recorded messages, etc.), notifications (e.g., emails, application notifications, social media notifications, news notifications, etc.). Wherein a parent or guardian may allow use of the vehicle with a request that a nomadic device such as a cell phone or tablet is not used. A ward of the parent or guardian may agree to the conditions but once granted access to the vehicle, may disable short-range communication blocking reception of the message and the limitation of the nomadic device. This the ward could hold the nomadic device with full access to email, text messages, social media, etc. contrary to the agreement. If the in-vehicle system, via the sensor, receives signals indicative of a cellular connection/use from a location/area of a driver seat while the phone is not connected to the in-vehicle infotainment system via the short-range connection, the system may alter vehicle conditions to deter the driver from not connecting and provide a notification to the parent or guardian.

In order to cover the cellular frequency spectrum, a broadband detection system must be employed. This could be realized using a broadband phased array (where the individual elements cover the entire cellular spectrum), or multiple narrow-band phased arrays to cover individual frequency bands. In the case of multiple phased arrays, they could potentially be contained in the same package provided the element coupling does not interfere with the array beamforming. Scanning resolution is determined by the size of the array in terms of both number of antenna elements and element spacing. The number of elements possible for a given spacing is limited by the element size. Thus, for a broadband array, scan resolution will necessarily decrease for the lower frequency bands. The scan resolution can be improved by increasing element spacing, but the spacing should not exceed roughly one half the wavelength of the highest frequency band, else grating lobes can form as the beam is scanned and inhibit localization.

Additionally, multiple phased array antennas can be placed around the vehicle to improve localization. While one phased array antenna will determine a direction, one or more phased array antennas can triangulate a region in space. Multiple phased array antennas will also mitigate the effects of multi-path and noise influencing the detection and localization.

Along with the RF sensor (configured to detect RF energy at multiple frequencies) the system includes a controller configured to perform digital signal processing (DSP) on the output of the sensor. The signal processing is used to determine a frequency and magnitude of the RF energy (the frequency may include multiple frequencies or a spectrum of frequencies around a center frequency). The signal processing may also be used to detected if energy adheres to a specific communication standard (e.g., 802.11 or Wi-Fi, cellular or GSM, LTE, UMTS, etc.) or a combination of multiple standards.

The RF Sensor monitors a detection area in the passenger compartment of the vehicle and may be used to identify specific locations or areas such as a driver seat area, a passenger seat area, or a rear seat area using a scanning beam from a phased array antenna (i.e., the sensor). If a cellphone emits RF energy (e.g., Bluetooth, Wi-Fi, or Cellular), the sensor can provide an output that can be analyzed by the controller. The controller can, based upon the output of the analysis, be used to trigger an alarm or any variety of actions such as limiting powertrain output power or speed, outputting a warning message (e.g., an audible or visual warning) to not used a cell phone while driving, or notifying a parent or guardian and outputting an audible or visual message that a notification has been sent.

The Digital Signal Processing, utilizing correlation function, may be used to determine if a phone in the vehicle has a Bluetooth, Wi-Fi or Cellular Connection.

Figure 1:
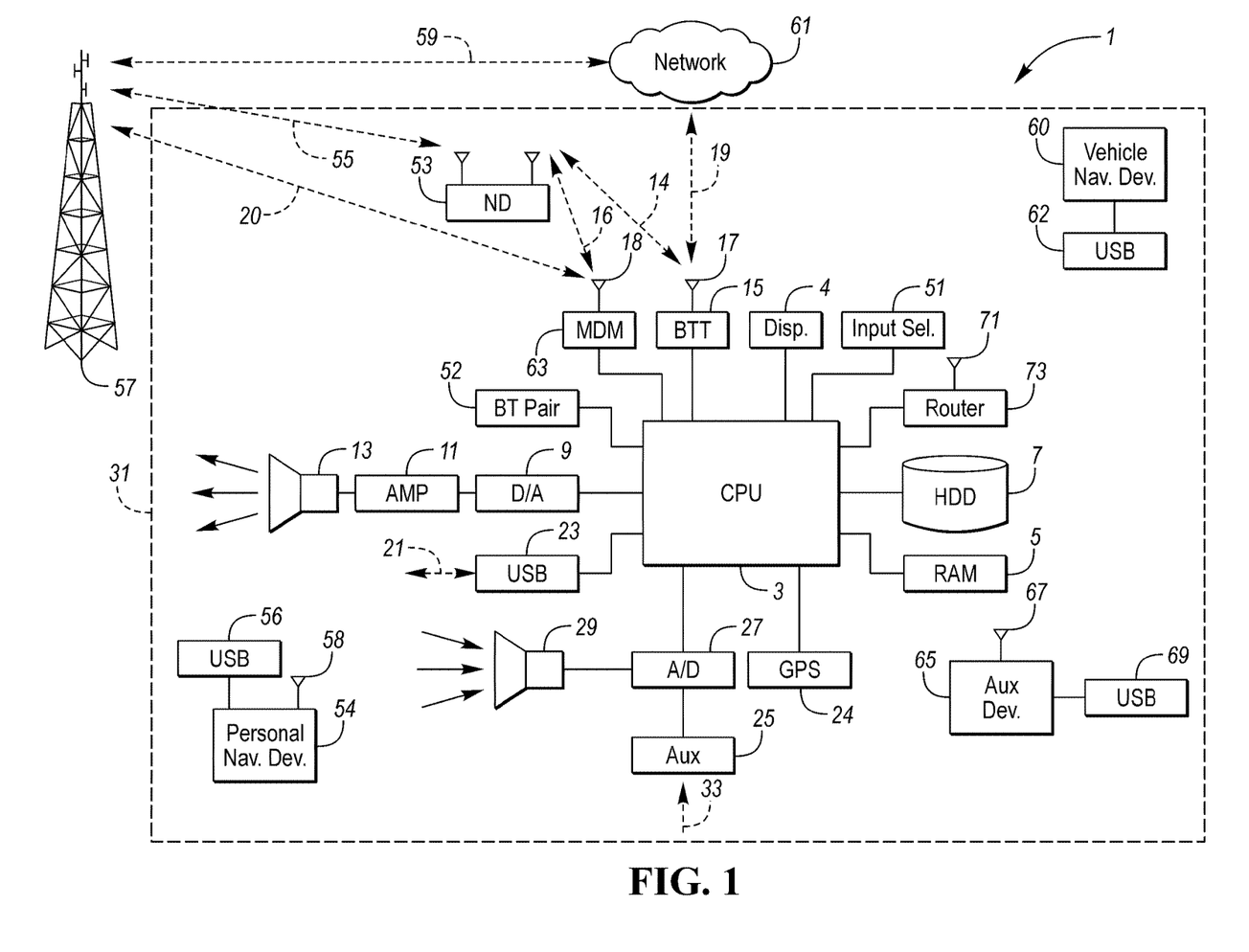
FIG. 1 is schematic diagram of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front-end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Figure 2A:
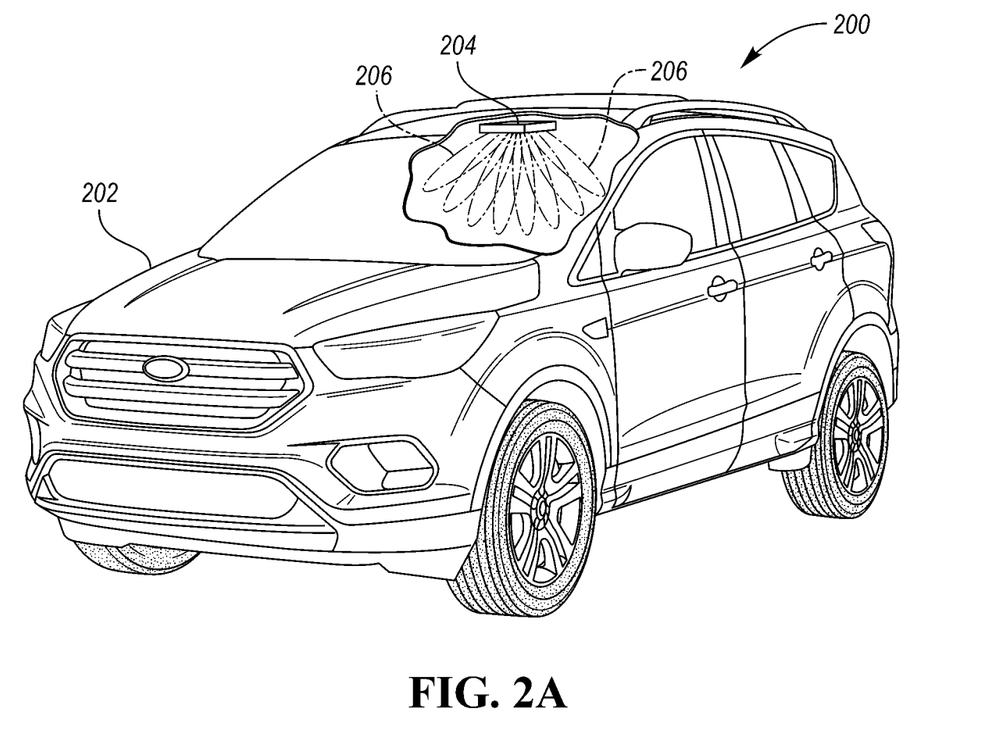
FIG. 2A is an illustration of a vehicle having a phased array antenna configured to output a location of a mobile device.

FIG. 2A is an illustration of a vehicle system 200 having an antenna system (e.g., a phased array antenna) 204 configured to scan an interior of a vehicle 202 by beamforming directional lobes 206 and outputting a location of a nomadic device based on RF energy detected and analyzed. The directional lobes 206 can identify a locational area, frequency, and magnitude of RF energy within the vehicle 202 and the processing may be used to determine a communication protocol associated with the RF energy. The directional lobes 206 may be configured to identify the locational area with sufficient sensitivity to identify a driver seat area, a passenger seat area, or a rear seat area. The controller may utilize this data with other data such as output from a passenger occupant detection system (PODS), For example, if the RF energy is emitted from a device located in a passenger seat area, but the PODS output indicates that the vehicle only has a driver, the controller may determine that the driver placed the device on the passenger seat to circumvent message/cell phone usage limitation and operate a powertrain with reduced performance, output an audible/visual warning, output wireless data such that a guardian or parent, is notified of vehicular operation and cellular phone usage.

Figure 2B:
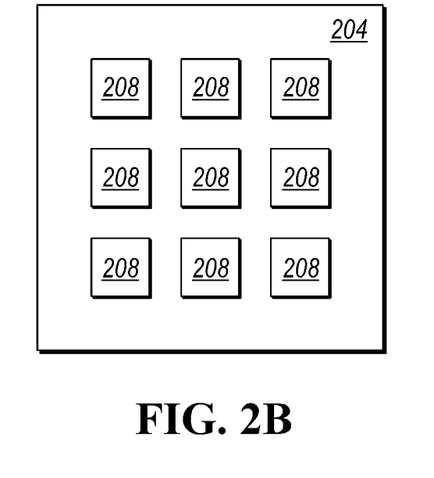
FIG. 2B is an illustration of a phased array antenna.

FIG. 2B is an illustration of a sensor 204 (e.g., a phased array antenna) that includes multiple elements 208. The elements may be multi-band patch antennas, or other antenna structure used in a phased array antenna. Often the phased array antenna are symmetrical in that both a number of elements in an X direction is equal to the number of elements in a Y direction. For example, a symmetrical phased array antenna may be configured in a 3×3, 4×4, 6×6, 9×9, or other equal X/Y configuration. When considering a phased array antenna that is tuned for low cellular bands (e.g., 800 MHz) often ¼ wave antennas are used as a tradeoff between size and performance. For the 800 MHz cellular bands, a ¼ wave antenna is approximately 37.5 centimeters and therefore a 3×3 antenna with each antenna spaced apart by ¼ wave would equal 37.5×5 or 187.5 cm. However, when placing the elements in a vehicle, often the available locations may not be able to meet the size requirements for a symmetrical phased array antenna. In those instances, the use of non-symmetrical phased array antennas may be used. Non-symmetrical phased array antennas include 1×3, 1×6, 1×9, 2×6, or other non-symmetrical configurations. Referring back to FIG. 2A, a symmetrical phased array antenna 204 may be located in a headliner of the vehicle 202, while a non-symmetrical phased array antenna may be located in another location (e.g., the Driver side A-pillar, Driver side B-pillar, Passenger side A-pillar, Passenger side B-pillar, dashboard, seat or other location) as the location is too narrow or too small to house a symmetrical antenna. The non-symmetrical antenna will still create lobes of sensitivity, however they will be oriented such that when used in conjunction with another antenna allows the system to triangulate a location of the RF transmitter.

Figure 3:
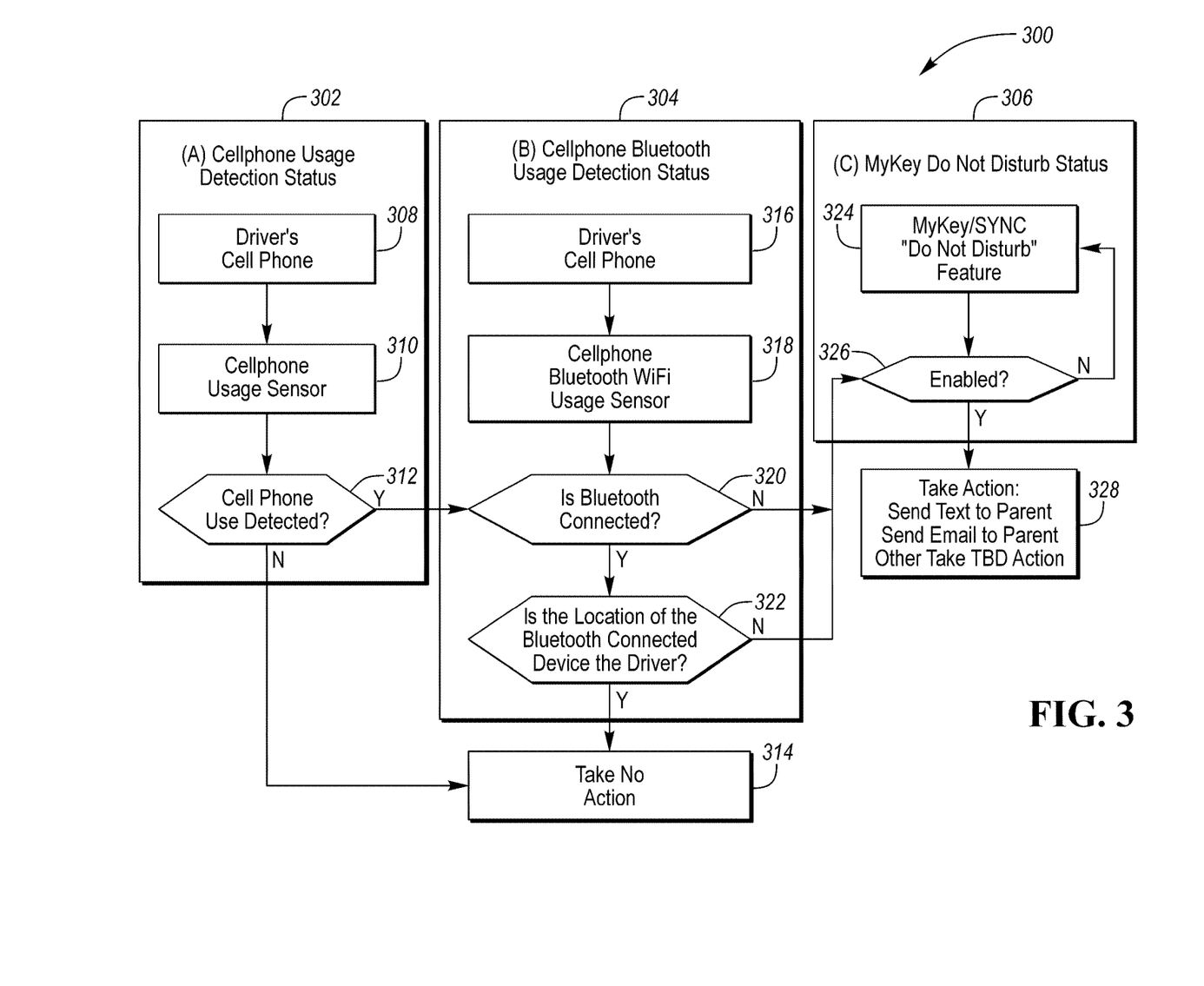
FIG. 3 is a flow diagram of a vehicle configuration system based on a mobile device use and location.

FIG. 3 is a flow diagram of a vehicle configuration system 300 based on mobile device use and location. This system has 3 main components, a nomadic device detection status 302 in which the nomadic device may be a cellular phone, tablet, smart watch, or other connected device. Next is the nomadic device short-range communication detection status 304, wherein the short-range communication includes Bluetooth, Near-Field Communication (NFC), inductive coupling, etc. Also, the system 300 includes a parental/guardian limitation 306 that operates via a vehicular system to limit wireless communication with a nomadic device within the vehicle while the vehicle is in motion, or the vehicle is in an operational state (e.g., engine running at a stop light or stop sign therefore no motion).

In the device detection status 302 block, a location of a wireless device is determined by a controller via output from a sensor (e.g., a phased array antenna). The location is based on detection of wireless energy emitted from the wireless device and the configuration of the sensor as to the direction of the sensitivity lobes (e.g., 206 from FIG. 2A) in step 308 or the intersection of lobes in the case where multiple phased array antennas are installed in the vehicle. The multiple phased array antennas may be located to scan the passenger compartment. The antenna locations include a headliner, a door panel, an instrument cluster, a dashboard, a floorboard, a seat back, a center console, a center rear seat back, inside an A, B, C, or D pillar (door pillar), inside a cargo area, or other flat/semi-flat surface facing the passenger compartment. When multiple arrays are including in a vehicle, the phased array antenna may include a 1-dimensional array that allows triangulation in conjunction with other array antennas. For example, a 1-dimensional array may be located in the A-pillar and a second phased array antenna may be located in the headliner such that the lobes intersect at a transmission location of the nomadic device.

Next in step 310 the controller, via the sensor, measures a frequency and magnitude of the RF energy wherein further, signal processing may be utilized to determine a communication standard. In block 312 the controller branches based on characterization of the RF energy. If cell phone usage is determined, based on energy, frequency, and protocol, the controller will branch to block 320, else the controller will exit to block 314.

While the device detection status 302 block is being evaluated, the short-range communication detection status 304 block is also being evaluated. The location of the wireless device is determined by the controller via output from the sensor in block 316. The location is based on detection of wireless energy emitted from the wireless device and the configuration of the sensor as to the direction of the sensitivity lobes (e.g., 206 from FIG. 2A) from one or more phased array antennas. Next in step 318 the controller, via the sensor, measures a frequency and magnitude of the RF energy wherein further, signal processing may be utilized to determine a communication standard. In block 320 the controller branches based on characterization of the RF energy and output from the decision block 312. If the controller determines that a short-range communication link is active (e.g., Bluetooth) the controller will branch to block 322 else to block 326. In block 322, the controller branches based on a location of the Bluetooth (short-range) connected device. If the short-range (Bluetooth) connected device is located in an area of the driver seat, then branch to block 314 and exit. For example, calls directed to the infotainment system using hands-free calling to reduce distractions and keep hands on the steering wheel, wherein the list of available contacts able to make calls may also be reduced (e.g., only allow 911, and parent/guardian calls) are allowed. But if the location is not the driver seat area, the controller will branch to block 326.

In the parental/guardian limitation 306, the controller in block 324 receives a signal indicative of a status of operation. The operational mode is a limited long-range wireless usage configuration such as the Ford MyKey/SYNC "Do not disturb". For example, limited long-range wireless usage may require a short-range (Bluetooth) connection to enable handsfree operation and limit calls and message sources/destinations from a long-range (cellular) connection. If an occupant of the vehicle attempts to circumvent the system by disabling the short-range connection, the system will detect the absence of that connection in the presence of a long-range connection. In block 326, the controller branches based on if the parental/guardian limitation has been enabled, long-range communication (cellular), and short-range communication (Bluetooth) and either branch to Block 328 or back to 324. For example, If the parental/guardian limitation has been enabled while driver cellular communication occurs and without Bluetooth, the controller will branch to block 328. In block 328, the controller will output cellular data (text message, email, notification) to a parent/guardian, output an audible/visual warning to the driver, or operate the powertrain of the vehicle in a limited fashion. For example for a given power demand or power request, the controller would reduce a power output, reduce a top speed, reduce a current vehicle speed, etc.

Figure 4:
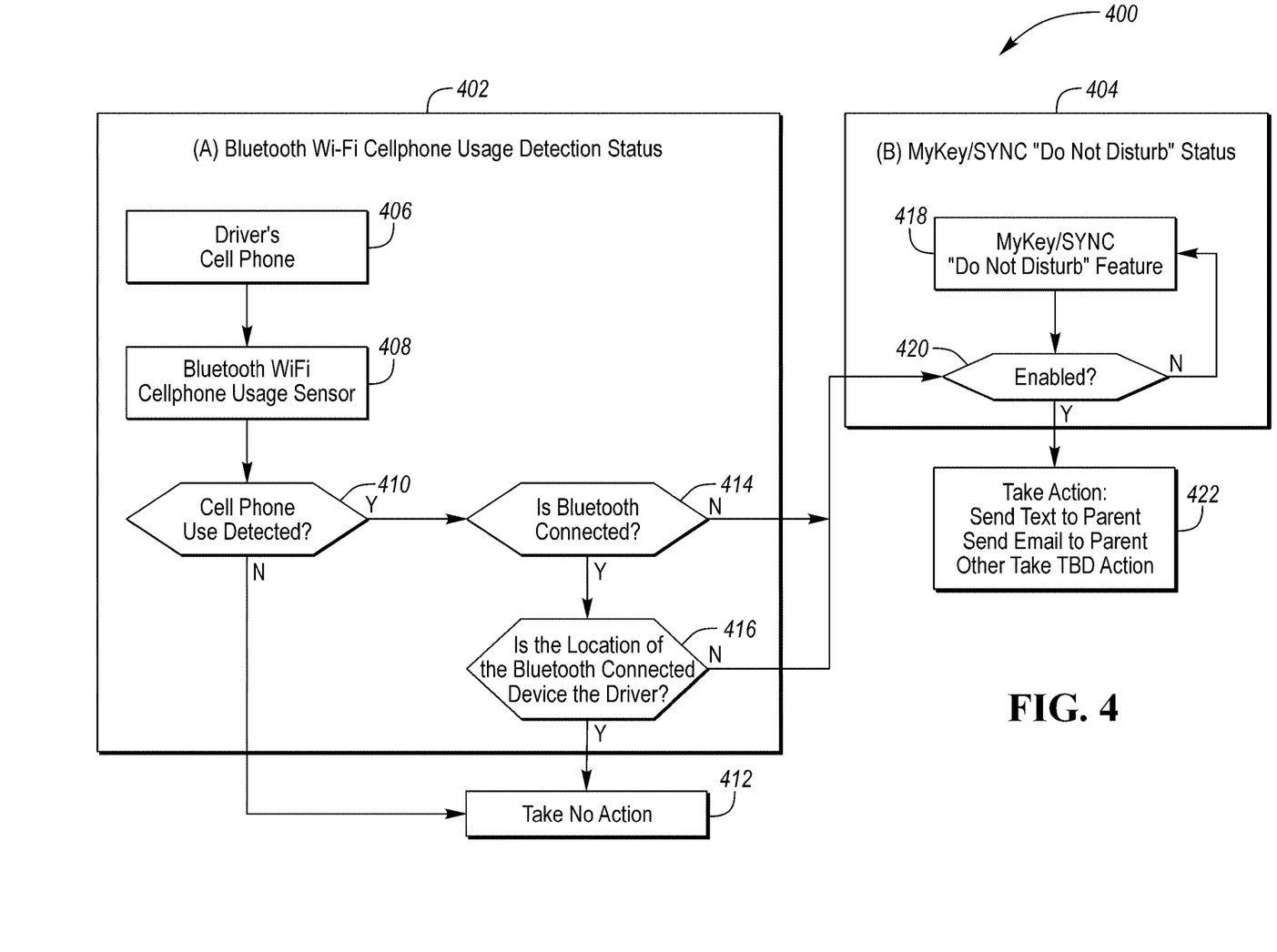
FIG. 4 is a flow diagram of a vehicle configuration system based on a mobile device use and location.

FIG. 4 is a flow diagram of a vehicle configuration system 400 based on a mobile device use and location. This system 400 has two main components, a nomadic device detection status 402 in which the nomadic device may be a cellular phone, tablet, smart watch, or other connected device. And, a parental/guardian limitation 404 that operates via a vehicular system to limit wireless communication with a nomadic device within the vehicle while the vehicle is in motion, or the vehicle is in an operational state (e.g., engine running at a stop light or stop sign therefore no motion).

The device detection status 402 block evaluates, both short-range and long-range communication (e.g., RF energy) in terms of location, frequency, and magnitude. The location of the wireless device is determined by the controller via output from the sensor in block 406. The location is based on detection of wireless energy emitted from the wireless device and the configuration of the sensor as to the direction of the sensitivity lobes (e.g., 206 from FIG. 2A) or intersection of lobes in the case of the use of multiple phased array antennas. Next in step 408 the controller, via the sensor, measures a frequency and magnitude of the RF energy wherein further, signal processing may be utilized to determine a communication standard. In blocks 410 and 414 the controller branches based on characterization of the RF energy. If cellular communication from a driver seat area is not detected, branch to block 412 and exit. If the controller determines that a short-range communication link is active (e.g., Bluetooth) the controller will branch to block 416 else to block 420. In block 416, the controller branches based on a location of the Bluetooth (short-range) connected device. If the short-range (Bluetooth) connected device is located in an area of the driver seat, then branch to block 412 and exit. For example, calls directed to the infotainment system using hands-free calling to reduce distractions and keep hands on the steering wheel, wherein the list of available contacts able to make calls may also be reduced (e.g., only allow 911, and parent/guardian calls) are allowed. But if the location is not the driver seat area, the controller will branch to block 420.

In the parental/guardian limitation 404, the controller in block 418 receives a signal indicative of a status of operation. The operational mode is a limited long-range wireless usage configuration such as the Ford MyKey/SYNC "Do not disturb". For example, limited long-range wireless usage may require a short-range (Bluetooth) connection to enable handsfree operation and limit calls and message sources/destinations from a long-range (cellular) connection. If an occupant of the vehicle attempts to circumvent the system by disabling the short-range connection, the system will detect the absence of that connection in the presence of a long-range connection. In block 420, the controller branches based on if the parental/guardian limitation has been enabled, long-range communication (cellular), and short-range communication (Bluetooth) and either branch to Block 422 or back to 418. For example, if the parental/guardian limitation has been enabled while driver cellular communication occurs and without Bluetooth, the controller will branch to block 422. In block 422, the controller will output cellular data (text message, email, notification) to a parent/guardian, output an audible/visual warning to the driver, or operate the powertrain of the vehicle in a limited fashion, (e.g., reduce a power output, reduce a top speed, reduce a current vehicle speed, etc.)

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an antenna system including one or more phased array antennas, configured to
      scan an interior space of the vehicle to detect a wireless energy emitted from a nomadic device within the vehicle, and
      identify the nomadic device to be at a driver seat area in the vehicle using the wireless energy; and
   a controller configured to
      responsive to the wireless energy, received via the antenna system, exceeding a magnitude and duration indicative of a cellular connection from the nomadic device at the driver seat area, verify if the nomadic device is connected to the vehicle through a local connection via a local protocol, and
      responsive to verifying the nomadic device is disconnected from the vehicle via the local protocol while the vehicle is in motion, operate a powertrain to limit a speed of the vehicle.

2. The vehicle of claim 1, wherein the antenna system further includes a symmetrical phased array antenna and a non-symmetrical phased array antenna.

3. The vehicle of claim 2, wherein the symmetrical phased array antenna is located in a vehicle headliner or a vehicle floorboard and the non-symmetrical phased array antenna is located in a door pillar.

4. The vehicle of claim 1, wherein the wireless energy is at a frequency indicative of a cellular connection, that is different from a local frequency via the local protocol.

5. The vehicle of claim 1, wherein the controller is further configured to
   transmit a control message to the nomadic device via the local connection, the control message including a parental control limitation.

6. The vehicle of claim 1, wherein the local connection is via Bluetooth, inductive coupling, near-field communication, Zigbee, or Wi-Fi.

7. The vehicle of claim 1, wherein the nomadic device is a cellular connected watch, cellular phone, or cellular connected tablet.

8. A system for a vehicle comprising:
   an antenna system including one or more phased array antennas, configured to
      scan an interior space of the vehicle to detect a wireless energy emitted from a nomadic device within the vehicle, and
      identify the nomadic device to be at a driver seat area in the vehicle using the wireless energy; and
   a controller configured to
      responsive to the wireless energy, received via the antenna system, exceeding a magnitude and duration indicative of a cellular connection from the nomadic device at the driver seat area, verify if the nomadic device is connected to the vehicle through a local connection via a local protocol, and
      responsive to verifying the nomadic device is disconnected from the vehicle via the local protocol while the vehicle is in motion, operate a powertrain to limit a speed of the vehicle.

9. The vehicle of claim 8 wherein the antenna system includes a symmetrical phased array antenna and a non-symmetrical phased array antenna.

10. The vehicle of claim 9, wherein the symmetrical phased array antenna is located in a vehicle headliner or a vehicle floorboard and the non-symmetrical phased array antenna is located in a door pillar.

11. The vehicle of claim 8, wherein the controller is further configured to, transmit a message to a guardian of the device.

12. The vehicle of claim 8, wherein the controller is further configured to, output a warning message.

13. The vehicle of claim 12, wherein the warning message is an audible message or a visual message.

14. The vehicle of claim 12, wherein the wireless energy is at a frequency indicative of a cellular connection, that is different from a local frequency indicative of the local connection.

15. A computer-implemented method for a vehicle, comprising:
- scanning, via an antenna system including one or more phased array antennas, an interior space of the vehicle to detect a wireless energy emitted from a wireless device within the vehicle;
- locating, by the antenna system, the wireless device to be at a driver seat area in the vehicle using the wireless energy;
- responsive to the wireless energy exceeding a magnitude and duration threshold indicative of a cellular connection from the wireless device at the driver seat area, verifying, by a controller, if the wireless device is connected to the vehicle through a Bluetooth connection; and
- responsive to verifying the wireless device is disconnected from the vehicle via the Bluetooth connection while the vehicle is in motion, operating, by the controller, a powertrain to limit a speed of the vehicle.

16. The method of claim 15, further comprising:
- sending a configuration message, by the controller, to the wireless device via the Bluetooth connection, to configure the wireless device to limit notifications and calls over the cellular link.

17. The method of claim 15 wherein the antenna system includes a symmetrical phased array antenna and a non-symmetrical phased array antenna.

* * * * *